(12) United States Patent
De Magalhaes (10) Patent No.: US 10,795,686 B2
(45) Date of Patent: Oct. 6, 2020

(54) INTERNATIONALIZATION CONTROLLER

(71) Applicant: INTERNATIONAL BUSINESS MACHINES CORPORATION, Armonk, NY (US)

(72) Inventor: Arthur De Magalhaes, Markham (CA)

(73) Assignee: International Business Machines Corporation, Armonk, NY (US)

(*) Notice: Subject to any disclaimer, the term of this patent is extended or adjusted under 35 U.S.C. 154(b) by 116 days.

(21) Appl. No.: 16/118,795

(22) Filed: Aug. 31, 2018

(65) Prior Publication Data

US 2020/0073672 A1 Mar. 5, 2020

(51) Int. Cl.
| | |
|---|---|
| *G06F 9/44* | (2018.01) |
| *G06F 9/30* | (2018.01) |
| *G06F 8/30* | (2018.01) |
| *G06F 8/38* | (2018.01) |
| *G06F 8/36* | (2018.01) |

(52) U.S. Cl.
CPC ............. *G06F 9/44* (2013.01); *G06F 8/31* (2013.01); *G06F 8/36* (2013.01); *G06F 8/38* (2013.01); *G06F 9/30003* (2013.01)

(58) Field of Classification Search
None
See application file for complete search history.

(56) References Cited

U.S. PATENT DOCUMENTS

| | | | |
|---|---|---|---|
| 8,504,543 B1 | 8/2013 | Andressen et al. | |
| 2001/0029455 A1* | 10/2001 | Chin | G06F 40/232 704/277 |
| 2004/0167784 A1* | 8/2004 | Travieso | G06F 40/14 704/270.1 |
| 2013/0144592 A1* | 6/2013 | Och | G06F 40/232 704/2 |
| 2014/0136945 A1 | 5/2014 | Ligman et al. | |
| 2014/0155041 A1 | 6/2014 | Aerrabotu | |
| 2016/0019205 A1* | 1/2016 | Kidwai | G06F 40/47 704/7 |
| 2016/0314029 A1 | 10/2016 | Gupta et al. | |
| 2018/0165279 A1* | 6/2018 | Issaev | G06F 40/242 |

OTHER PUBLICATIONS

Peter Mell et al, The NIST Definition of Cloud Computing, National Institute of Standards and Technology, Publication 800-145, 2011, entire document.
Fielding et al, 14 Header Field Definitions, Hypertext Transfer Protocol—HTTP/1.1, RFC, 2016, entire document.
(Continued)

*Primary Examiner* — Shih-Wei Kraft
(74) *Attorney, Agent, or Firm* — Patrick J. Daugherty; Daugherty & Del Zoppo Co., LPA (57) ABSTRACT

Aspects of the present invention provide devices with a first computer processor that in response to receiving a token from an agent associated with a second computer processor, returns language requirements to the agent associated with the second computer processor identified by the token for translating first data processed by the second computer processor. The translated first data is returned by the second computer processor to a third computer processor. The second computer processor and the third computer processor are different computer processors.

14 Claims, 5 Drawing Sheets

(56) References Cited

OTHER PUBLICATIONS

HTTP/MDN, Accept-Language, https://developer.mozilla.org/en-US/docs/Web/HTTP/Headers/Accept-Language, 2018, entire document.

HTTP/MDN, Content-Language, https://developer.mozilla.org/en-US/docs/Web/HTTP/Headers/Content-Language, 2018, entire document.

* cited by examiner

INTERNATIONALIZATION CONTROLLER

BACKGROUND

The field of computing includes human language translation of electronic payloads.

Electronic requests for a payload, such as a request for delivery of a webpage, can include a human language requirement, such as in French, English, Dutch, Spanish, etc. For example, a webserver or hypertext transfer protocol (HTTP) server may service requests for a uniform resource locator (URL) from web browsers of users located internationally, where the returned webpage displays different human languages specified by language settings of the corresponding web browser. The language requirements can be passed by a language requirement, such as an HTTP ACCEPT-LANGUAGE request-header field, which specifies language requirements.

For example, "Accept-language: da, en-gb;q=0.8,en; q=0.7" means Danish is preferred for the returned web page, but the requesting browser will accept British English and less preferably other types of English. The variable "q" defines a weight for language and defaults to 1.0. The webpage includes portions of data, which are displayed by the web browser in the requested human language, and portions of the webpage that include program code, scripts or programming keywords, which are not translated.

The server can distribute workloads to satisfy the request and act as a primary server, which receives an initial electronic request. For example, a URL requested of a primary server may include data generated from one or more secondary servers, such data from a database server, an authentication from an authentication server, a template from another server, graphics of one portion of the URL from a first server and graphics of another portion of the URL from a second server, etc. Each of the secondary servers may further divide the workload. Conventional practice is to use application programming interfaces (APIs) for processing portions of the workload, which allows optimization of the servers used for the distributed processing. For example, a database server can be optimized to provide access to data used by a variety of application servers.

BRIEF SUMMARY

In one aspect of the present invention, a computer-implemented method for internationalizing distributed workloads includes executing on a first computer processor in response to receiving a token from an agent associated with a second computer processor, returning language requirements to the agent associated with the second computer processor identified by the token for translating first data processed by the second computer processor. The translated first data is returned by the second computer processor to a third computer processor. The second computer processor and the third computer processor are different computer processors.

In another aspect, a system has a first hardware computer processor, computer readable memory in circuit communication with the first computer processor, and a computer-readable storage medium in circuit communication with the first computer processor and having program instructions stored thereon. The first computer processor executes the program instructions stored on the computer-readable storage medium via the computer readable memory and thereby internationalizes distributed workloads, which in response to receiving a token from an agent associated with a second computer processor, returns language requirements to the agent associated with the second computer processor identified by the token for translating first data processed by the second computer processor. The translated first data is returned by the second computer processor to a third computer processor. The second computer processor and the third computer processor are different computer processors.

In another aspect, a computer program product for internationalizing distributed workloads has a computer-readable storage medium with computer readable program code embodied therewith. The computer readable program code includes instructions for execution by a first computer processor that cause the first computer processor to, in response to receiving a token from an agent associated with a second computer processor, return language requirements to the agent associated with the second computer processor identified by the token for translating first data processed by the second computer processor. The translated first data is returned by the second computer processor to a third computer processor. The second computer processor and the third computer processor are different computer processors.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
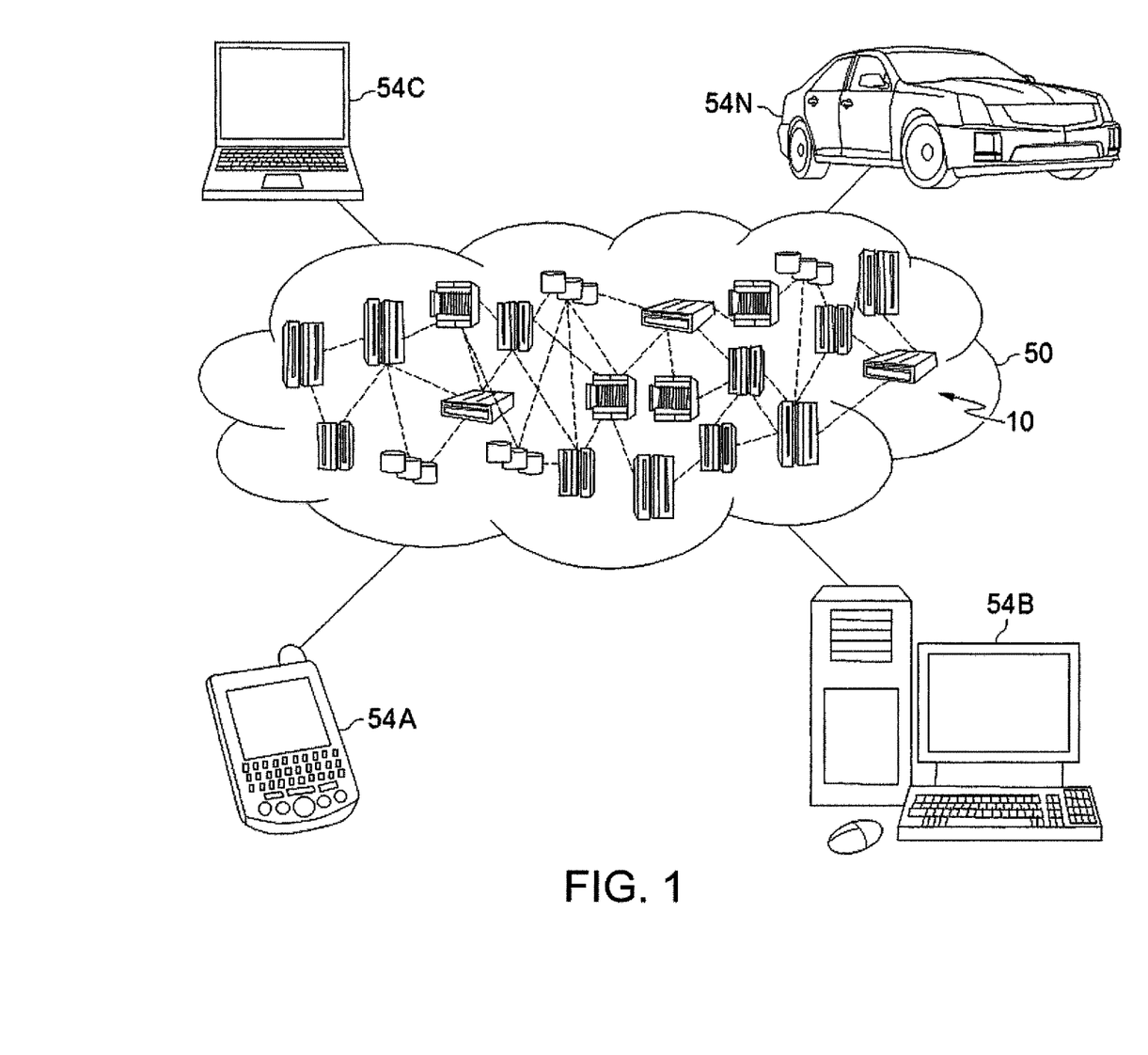
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
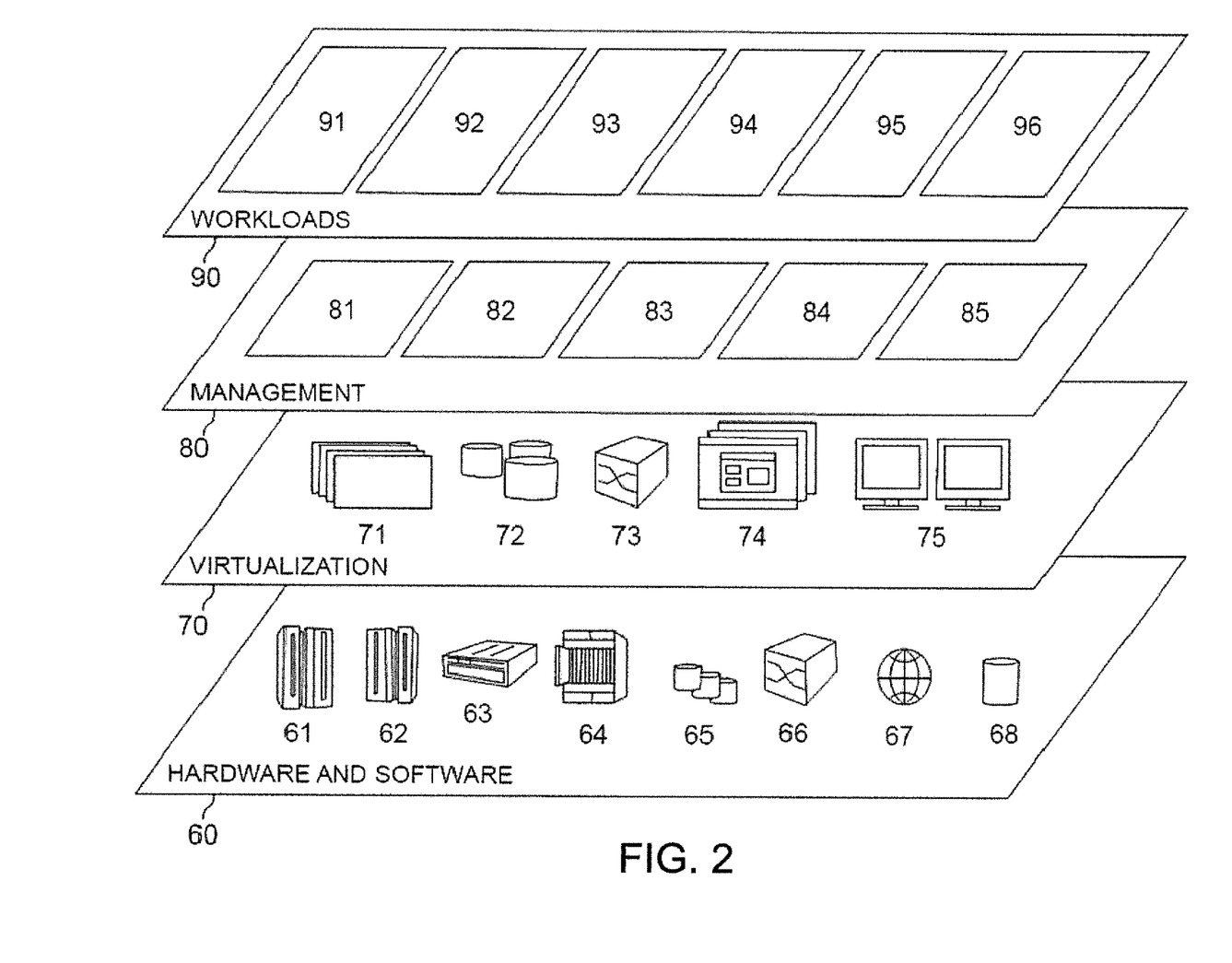
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for internationalizing distributed workloads 96.

Figure 3:
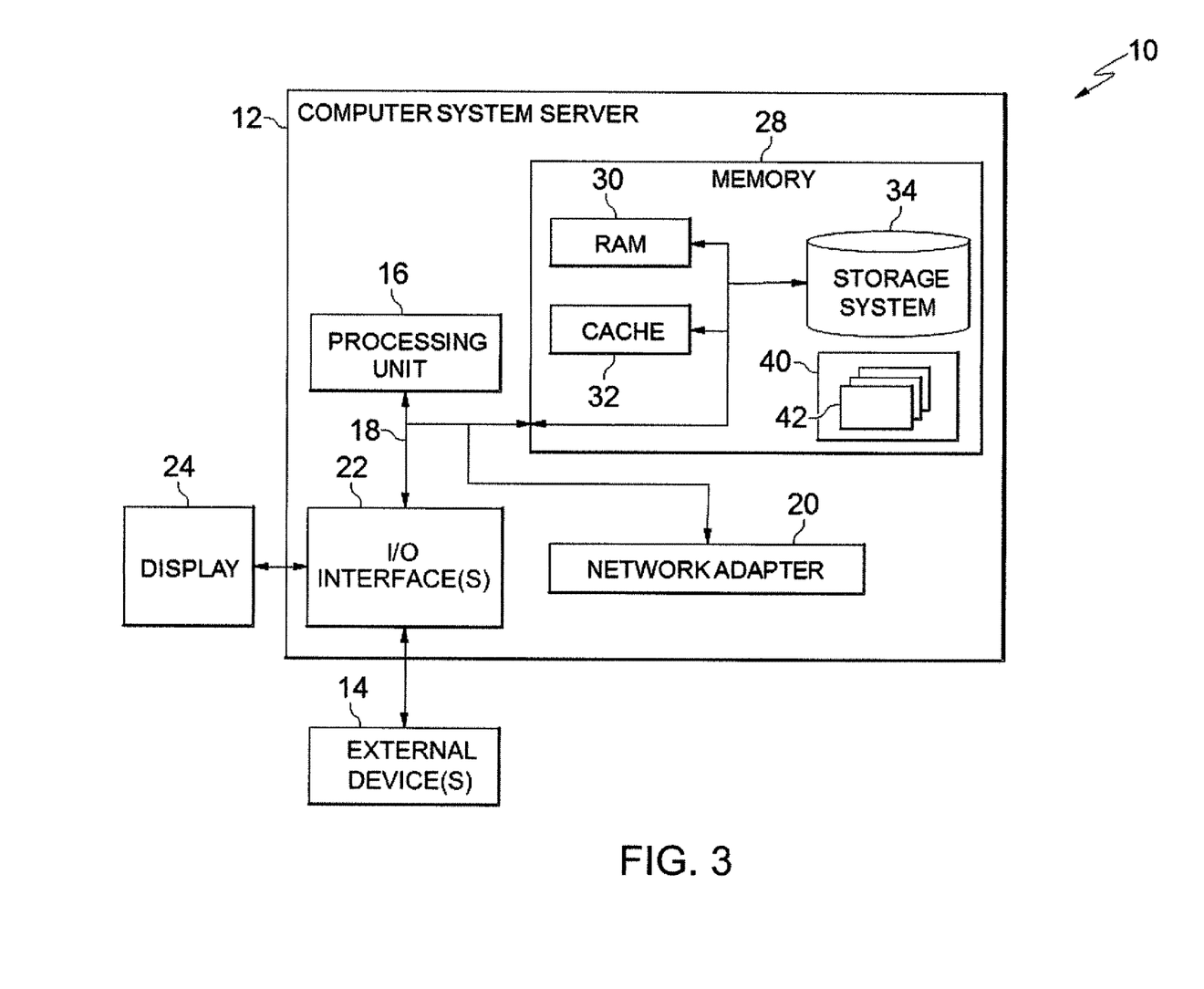
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
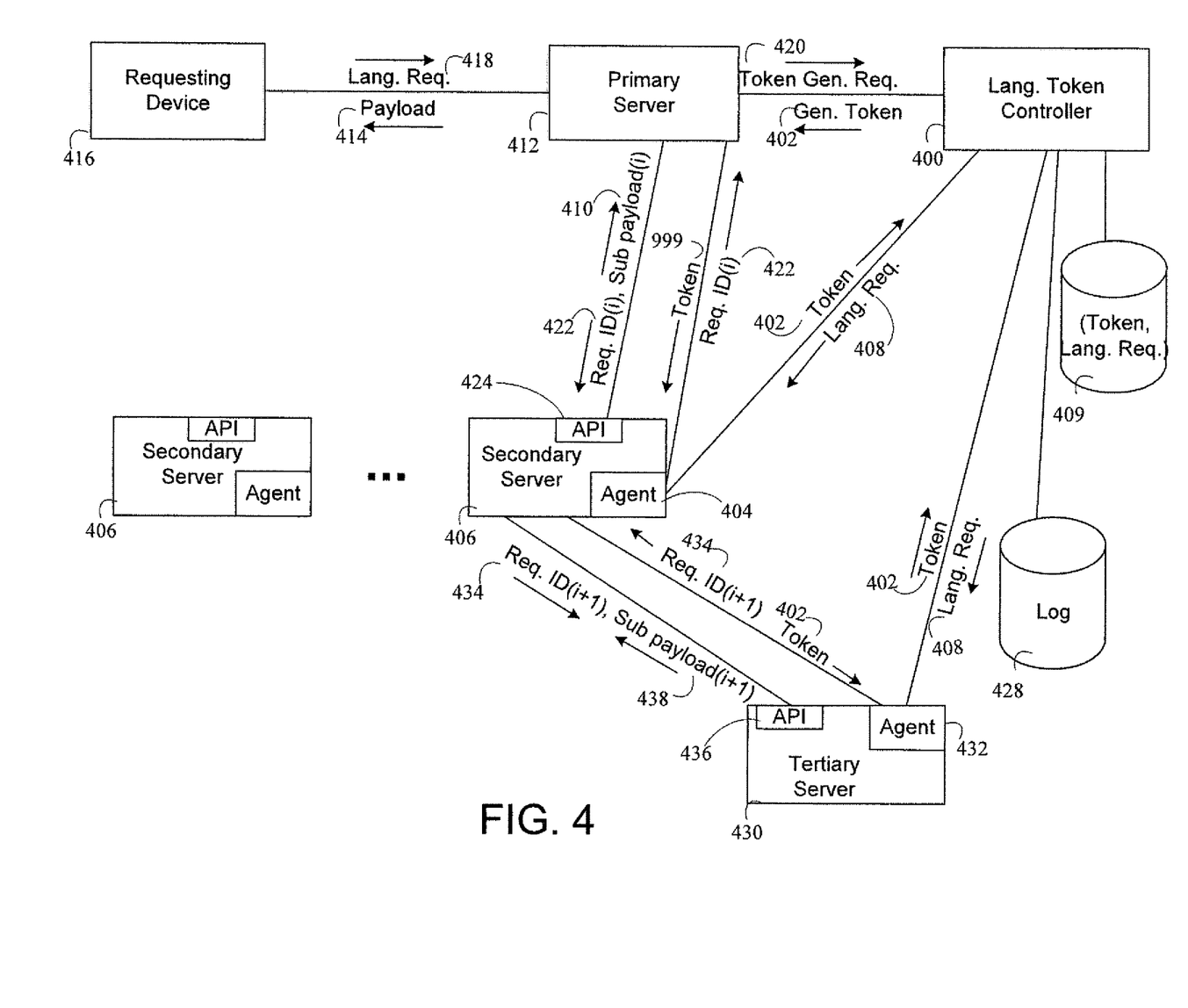
FIG. 4 depicts an example schematic illustration of an embodiment of the present invention.

FIG. 4 schematically illustrates an example according to the present invention for internationalizing distributed workloads. A language token controller 400, suitably embodied by a first configured computer processor, receives a token 402 from an agent 404 associated with a secondary server 406, suitably embodied by a second computer processor. Each of the configured processors is described with reference to a processing unit or processor 16 of FIG. 3. Each of the configured processors can be distributed over the network and act as the node 10 in the cloud computing environment 50.

The language token controller 400 retrieves the token 402 and a language requirement 408 from the memory 28 (FIG. 3). For example, the token 402 and the language requirement 408 can be retrieved from a table 409 which stores the values as a pair of related values. The token 402 is suitably embodied as a binary value, alphanumeric string value, or combinations thereof. The language requirement 408 identifies a human language that the secondary server 406 uses to translates data included in a sub-payload$_i$ 410, where i is a positive integer, returned to a primary server 412. The primary server 412 is suitably embodied as a third configured computer processor.

The language requirement 408 is suitably embodied by an alphanumeric string, which identifies a human language in which data is to be returned. In some instances, the translated data is exclusive of portions that use computing programming constructs, such as computer programming language keywords, computer program identifiers, computer program parameters and computer program code. For example, data displayed on a web browser according to language settings of the web browser is translated, and computing programming language constructs that the web browser uses to organize, format and properly display the data are not translated.

The language requirements 408 can include an encoding, such as a character encoding for a human language, such as ISO-8859, MS-WINDOWS character sets, JIS X 0208, and the like. The language requirements 408 can include language alternatives. The language requirements can include weighting of the language alternatives. In some embodiments, the language requirements 408 can include a different language translation for computing language constructs. For example, the language requirements can include translation of data exclusive of programming language constructs into Danish while translating computing programming constructs into French.

The language token controller 400, in response to receiving the token 402 from an agent 404, returns the language requirements 408 to the agent 404. The agent 404 is suitably embodied by program instructions executed by a configured computer processor.

The secondary server 406 translates the data included in the sub-payload$_i$ 410 and returns the sub-payload$_i$ 410 to a primary server 412. The primary server 412 assembles the sub-payloads as first data, second data, etc., from one or more secondary servers into a payload 414, which is returned in response to a request from a requesting device 416.

In some embodiments, the primary server 412 notifies the language token controller 400 that the token 402 can be deleted. That is, the primary server 412 has completed the transaction by returning the payload 414 with data translated according to the language requirements 408, and the token 402 can be removed.

The requesting device 416 is suitably embodied by another configured computer processor, such as in another computer system server 12 or the local computing device 54 (FIG. 1). The requesting device 416 sends a request 418 for the payload 414 to the primary server 412, which is responsible for servicing the request 418. For example, the payload request sent from a smartphone to an HTTP server includes a URL request for a webpage. The request 418 includes the language requirements 408 for the payload 414, such as the HTTP ACCEPT-LANGUAGE request-header field.

The primary server 412 receives the payload request 418 and, in response, sends a request 420 for a token generation to the language token controller 400. The token generation request 420 includes the language requirements 408. The language requirements included in the token generation request 420 can include a same format or a different format as the language requirements included in the payload request 418. For example, the payload request includes the HTTP ACCEPT-LANGUAGE request-header field, while the token generation request include a proprietary format for the language requirements.

The language token controller 400, in response to the token generation request 420 from the primary server 412, generates the token 402 and returns the generated token 402 to the primary server 412. The language token controller 400 stores the generated token 402 with the corresponding language requirements 408 in the memory 28, such as in the table 409, as related pairs of the token 402 and the related language requirements 408.

The primary server 412 distributes work to the secondary servers 406 to obtain the data for the payload 414. The primary server 412 exchanges with the corresponding agent 404 of the secondary server 406, the token 402 for a request identifier 422, such as a transaction identifier, a work identifier, a thread identifier, a process identifier, a socket identifier, and the like. The request identifier 422 identifies the unit of distributed work to be performed by the secondary server 406 and the request identifier 422 is identifiable through an application programming interface (API) 424. The primary server 412 distributes the work to the secondary server 406 through the API 424 using means known in the art. The secondary server 406 generates data for the distributed work. The agent 404 of the secondary server 406 exchanges with the language token controller 400, the token 402 for the language requirements 408 as described above, and translates generated data as the sub-payload$_i$ 410 according to the language requirements 408. The secondary server 406 returns to the primary server 412 the sub-payload$_i$ 410.

In some embodiments, the language token controller 400 logs the token for language requirements requests in a log 428, which is embodied by the memory 28. For example, the language token controller 400 stores in the log 428: the token 402, the language requirements 408, and an identifier of a server requesting the exchange or using the token. In some embodiments, the log 428 includes an identifier of the processing unit 16 requesting generation of the token.

In some embodiments, the language token controller 400 recycles or reuses the tokens 402 according to the language requirements 408. For example, a frequent language requirement is Danish, which can be identified from the log 428. One token which relates to language requirement of Danish is stored kept by the language token controller 400 to persist across instances of different payloads, different servers, and combinations thereof. The recycling or reuse of the tokens 402 saves the overhead of the token generation process.

The secondary server 406 can also distribute work that it has received from the primary server 412 to a tertiary server 430. The secondary server 406 exchanges with an agent 432 associated with the tertiary server, the token 408 for a request identifer$_{i+1}$ 434. The request identifer$_{i+1}$ 434 identifies work distributed to the tertiary server by the secondary server 406. The secondary server 406 distributes the work to the tertiary server 430 using a second layer application programming interface (API) 436.

The tertiary server 430 obtains the language requirements similar to the secondary server 406 by the agent 432 exchanging with the language token controller 400, the token 402 for the language requirements 408. The tertiary server 430 translates data of a sub-payload$_{i+1}$ 438 that is translated before returning the sub-payload$_{i+1}$ 438 to the secondary server 404.

Thus, the workload of the primary server can be distributed to n processing units 16 (FIG. 3) arranged in 1 to m layers, where n and m are positive integers. Examples of distributed work units illustrated by the nodes 10 (FIG. 1) include enterprise service buses, database management systems, container processors, such as Docker, operating system script processors, such as Bash, web servers, such as arranged in the RESTful framework, etc. Each processing unit 16 translates only the portion of the payload 414 that the processing unit 16 actually processes or generates. The individual processing units 16 are able to discriminate between data that should be translated and data that should not be translated. Each layer assembles the sub-payloads until the final payload is assembled by the primary server 412.

Conventional practice is to modify APIs to include language requirements or for the primary server 412 to translate the entire payload. Modifying the APIs is difficult for established APIs. That is, the APIs are a negotiated interface between all processing units 16 using the API and thus, changing the API includes both changing the processing units 16 calling the API and synchronously changing the processing units 16 of the called API. The language token controller 400 allows the APIs to remain unchanged. The language token controller avoids changes to APIs by use of tokens exchanged by agents associated with processing units 16 for language requirements. Thus, an API can be internationalized by modifying program instructions within the processing unit 16 and asynchronously adding the associated agent 404, 432 to operate with the language token controller 400.

Translating the entire payload by the primary server 412 can lead to erroneous data with work distributed to other processing units. The primary server 412 may not even be aware of which portions of the payload 414 are programming constructs and which portions are human language data.

Figure 5:
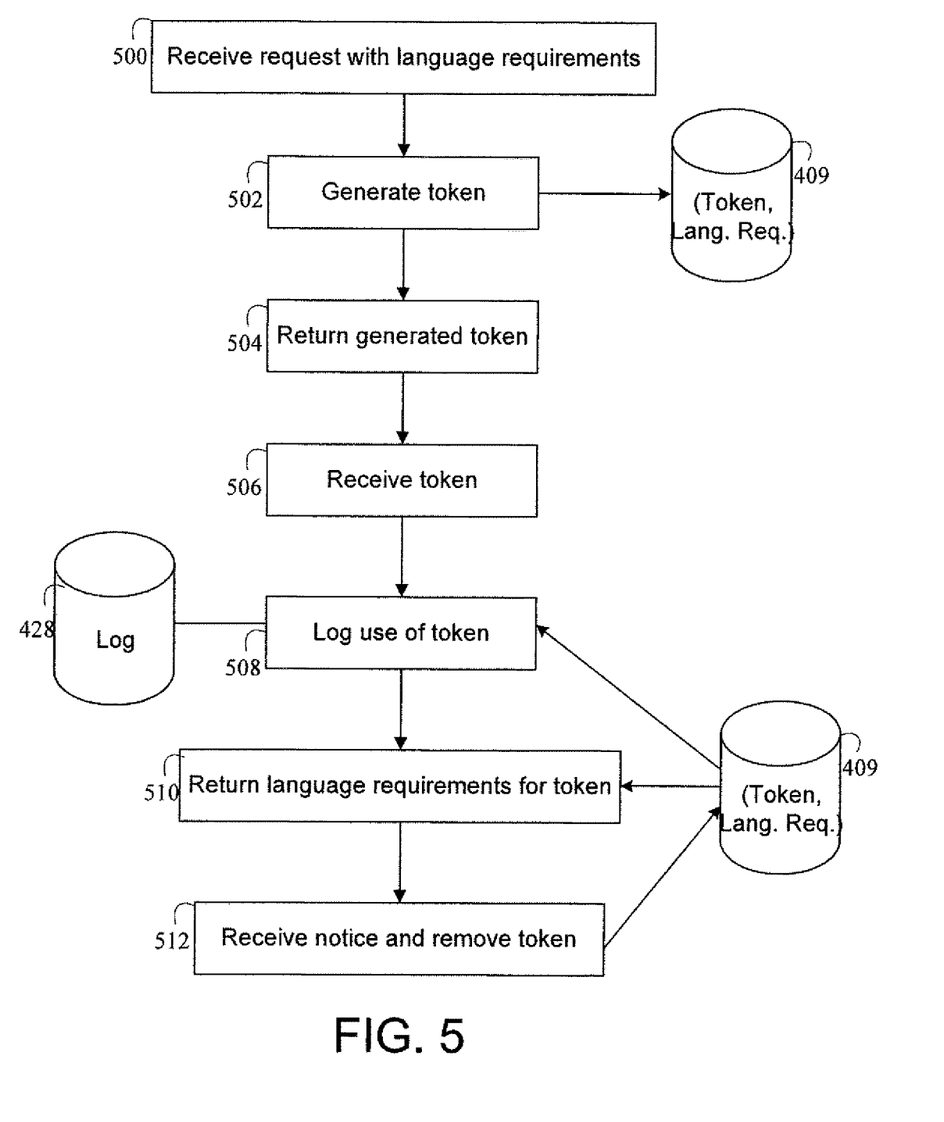
FIG. 5 is a flow chart illustration of an embodiment of the present invention.

FIG. 5 illustrates one embodiment of a method according to the present invention for internationalizing distributed workloads. At 500, a processor that is configured according to an aspect of the present invention (the "configured processor") receives a request for generation of the token 402 from one requesting processing unit 16. The token generation request includes the language requirements 408 for translating data.

At 502, the configured processor, in response to the token generation request, generates the token 402 (FIG. 4). The token 402 includes a binary value, alphanumeric string value, and combinations thereof. The generated token 402 is unique among other tokens generated and stored by the configured processor. The generated token 402 and related language requirements 408 are stored in the table 409 as a pair.

At 504, the configured processor returns the token 402 to the one processing unit 16 that requested the generated token 402.

At 506, the configured processor receives the token 402 from the agent 404, 432 associated with one processing unit 16.

At 508, the configured processor logs use of the received token 402 by storing the identity of the one processing unit associated with the agent 404, 432 that sent the token 402 in the log 428. The log 428 can include storing the token 402, the language requirements 408, and combinations thereof. In some embodiments, 508 is omitted.

At 510, the configured processor returns the language requirements 408 related to the token 402 to the one processing unit associated with the agent 404, 432. The configured processor obtains the language requirements 408 from the table 409 using the token 402 as the key value to the pair in the table 409. Acts 506-510 can be repeated for a plurality of agents 404, 432 performing distributed work for the one processing unit 16 that requested generation of the token. In some embodiments, the token 402 is persistent across instances of different payloads, different servers 12 or processing units 16, and combinations thereof, and acts 506-510 can be repeated for a plurality of agents 404, 432.

At 512, the configured processor receives a notice to remove the token 402 from one processing unit 16 and the configured processor removes the token 402 from the table 409. In some embodiments, 512 is omitted.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   in response to receiving a payload request, a primary server computer processor provisioned within a distributed cloud computing environment sending a token generation request comprising language requirements to a language token controller computer processor provisioned within the distributed cloud computing environment;
   in response to receiving the token generation request, the language token controller computer processor generating a token, associating the token with the language requirements, and sending the token to the primary server computer processor;
   in response to receiving the token, the primary server computer processor sending the token to an agent of a secondary server and to different agents of different servers in a plurality of different servers;
   in response to receiving the token, the agent and each different agent sending a respective request identifier to the primary server computer processor;
   in response to receiving each respective request identifier from the agent and each different agent, the primary server computer processor distributing a respective unit of work to the secondary server and each different server through a respective application programming interface (API) of the secondary server and each different server, wherein each respective request identifier identifies the respective unit of work distributed to the secondary server and each different server and each respective request identifier is identified through the respective API of the secondary server and each different server;

in response to receiving each respective unit of work, the secondary server and each different server generating respective data for each respective unit of work;

the agent and each different agent sending the token to the language token controller computer processor;

in response to receiving the token from the agent and each different agent, the language token controller computer processor returning the language requirements associated with the token to the agent and each different agent, the secondary server and each different server translating the respective data for each respective unit of work into a language identified by the language requirements, and sending a respective sub-payload with the translated respective data for each respective unit of work to the primary server computer processor;

the primary server computer processor assembling each respective sub-payload with the translated respective data for each respective unit of work into a payload, and returning the assembled payload in response to the received payload request;

wherein each respective API remains unchanged through the use of the token; and wherein each request identifier is selected from the group consisting of: a transaction identifier, a work identifier, a thread identifier, a process identifier, and a socket identifier.

2. The method of claim 1, wherein the translated respective data includes non-translated computing programming constructs and translated human language words.

3. The method of claim 1, further comprising: in response to the receiving the token from the agent and each different agent, logging in a memory an identifier of the secondary server and each different server which used the token.

4. The method of claim 1, wherein generating the token comprises: reusing tokens according to the language requirements.

5. The method of claim 1, further comprising:
integrating computer-readable program code into a computer system comprising the primary server computer processor, a computer readable memory in circuit communication with the primary server computer processor, and a computer readable storage medium in circuit communication with the primary server computer processor; and wherein the primary server computer processor executes program code instructions stored on the computer readable storage medium via the computer readable memory and performs the sending the token generation request to the language token controller computer processor, the sending the token to the agent and each different agent, the distributing the respective unit of work to the secondary server and each different server, the assembling the payload, and the returning the assembled payload in response to the received payload request.

6. The method of claim 5, wherein the computer-readable program code is provided as a service in a cloud environment.

7. A system, comprising:
a first computer processor;
a computer readable memory in circuit communication with the first processor; and
a computer readable storage medium in circuit communication with the first processor;
wherein the first processor executes program instructions stored on the computer readable storage medium via the computer readable memory and thereby:
in response to receiving a payload request, sends a token generation request comprising language requirements to a language token controller, wherein the language token controller generates a token, associates the token with the language requirements, and sends the token to the first processor;
sends the token received from the language token controller to an agent of a secondary server and to different agents of different servers in a plurality of different servers, wherein in response the agent and each different agent sends a respective request identifier to the first processor, wherein the language token controller returns the language requirements associated with the token to the agent and each different agent in response to receiving the token from the agent and each different agent;
distributes a respective unit of work to the secondary server and each different server through a respective application programming interface (API) of the secondary server and each different server in response to receiving each respective request identifier from the agent and each different agent, wherein each respective request identifier identifies the respective unit of work distributed to the secondary server and each different server and each respective request identifier is identified through the respective API of the secondary server and each different server, and wherein the secondary server and each different server translates the respective data for each respective unit of work into a language identified by the language requirements and sends a respective sub-payload with the translated respective data for each respective unit of work to the first processor;
assembles each respective sub-payload with the translated respective data for each respective unit of work into a payload; and
returns the assembled payload in response to the received payload request;
wherein each respective API remains unchanged through the use of the token; and
wherein each request identifier is selected from the group consisting of: a transaction identifier, a work identifier, a thread identifier, a process identifier, and a socket identifier.

8. The system of claim 7, wherein the translated respective data includes non-translated computing programming constructs and translated human language words.

9. The system of claim 7, wherein the language token controller logs in a memory an identifier of the secondary server and each different server which used the token in response to the receiving the token from the agent and each different agent.

10. The system of claim 7, wherein the first processor executes program instructions stored on the computer readable storage medium via the computer readable memory and thereby:
reuses tokens according to the language requirements.

11. A computer program product, comprising:
a computer readable storage medium having computer readable program code embodied therewith, the computer readable program code comprising instructions executed by a first computer processor that causes the first computer processor to:
in response to receiving a payload request, send a token generation request comprising language requirements to a language token controller, wherein the language token controller generates a token, associates the token with the language requirements, and sends the token to the first processor;
send the token received from the language token controller to an agent of a secondary server and to different agents of different servers in a plurality of different servers, wherein in response the agent and each different agent sends a respective request identifier to the first processor, wherein the language token controller returns the language requirements associated with the token to the agent and each different agent in response to receiving the token from the agent and each different agent;
distribute a respective unit of work to the secondary server and each different server through a respective application programming interface (API) of the secondary server and each different server in response to receiving each respective request identifier from the agent and each different agent, wherein each respective request identifier identifies the respective unit of work distributed to the secondary server and each different server and each respective request identifier is identified through the respective API of the secondary server and each different server, and wherein the secondary server and each different server translates the respective data for each respective unit of work into a language identified by the language requirements and sends a respective sub-payload with the translated respective data for each respective unit of work to the first processor;
assemble each respective sub-payload with the translated respective data for each respective unit of work into a payload; and
return the assembled payload in response to the received payload request;
wherein each respective API remains unchanged through the use of the token; and
wherein each request identifier is selected from the group consisting of: a transaction identifier, a work identifier, a thread identifier, a process identifier, and a socket identifier.

12. The computer program product of claim 11, wherein the translated respective data includes non-translated computing programming constructs and translated human language words.

13. The computer program product of claim 11, wherein the language token controller logs in a memory an identifier of the secondary server and each different server which used the token in response to the receiving the token from the agent and each different agent.

14. The computer program product of claim 11, wherein the instructions for execution cause the first computer processor to:
reuse tokens according to the language requirements.

* * * * *